United States Patent
Friedmann et al.

(10) Patent No.: US 9,749,441 B2
(45) Date of Patent: Aug. 29, 2017

(54) APPLICATION SERVER RUNLEVEL FRAMEWORK

(75) Inventors: Björn Friedmann, Rheinmünster (DE); Werner Rehm, Heidelberg (DE); Florian Föbel, Bürstadt (DE); Christian Goldbach, Mannheim (DE); Matthias Rinck, Klingenmünster (DE); Jochen Müller, Heidelberg (DE); Martin Hartig, Speyer (DE); Achim Braemer, Heidelberg (DE)

(73) Assignee: SAP SE, Walldorf (DE)

(*) Notice: Subject to any disclaimer, the term of this patent is extended or adjusted under 35 U.S.C. 154(b) by 846 days.

(21) Appl. No.: 12/633,523

(22) Filed: Dec. 8, 2009

(65) Prior Publication Data
US 2011/0138027 A1    Jun. 9, 2011

(51) Int. Cl.
| | |
|---|---|
| *H04L 29/08* | (2006.01) |
| *G06F 21/62* | (2013.01) |
| *G06F 17/30* | (2006.01) |
| *H04L 29/06* | (2006.01) |
| *G06F 9/52* | (2006.01) |

(52) U.S. Cl.
CPC .............. *H04L 67/32* (2013.01); *G06F 9/52* (2013.01); *G06F 17/30* (2013.01); *G06F 17/30595* (2013.01); *G06F 21/6218* (2013.01); *H04L 65/1063* (2013.01); *H04L 67/10* (2013.01)

(58) Field of Classification Search
CPC ..... H04L 12/2858; H04L 29/00; H04L 67/10; H04L 67/28; H04L 67/32; H04L 67/306; G06F 21/604; G06F 21/6218; G06F 17/30; G06F 17/30595; G06F 17/30289
USPC .......................................................... 709/206
See application file for complete search history.

(56) References Cited

U.S. PATENT DOCUMENTS

| | | | | |
|---|---|---|---|---|
| 5,941,947 A | * | 8/1999 | Brown ................ | G06F 21/6218 709/225 |
| 8,291,490 B1 | * | 10/2012 | Ahmed ................ | G06F 21/604 726/17 |
| 8,447,829 B1 | * | 5/2013 | Geller et al. .................. | 709/217 |
| 8,645,516 B2 | * | 2/2014 | Bechtel ............ | G06F 17/30994 709/203 |

(Continued)

OTHER PUBLICATIONS

"LuaVIEW", retrieved from http://www.citengineering.com/luaview/clientsrv_manual.html, 2003, 11 pages.

*Primary Examiner* — Ramy M Osman
(74) *Attorney, Agent, or Firm* — Brake Hughes Bellermann LLP

(57) ABSTRACT

According to one general aspect, a method for managing a plurality of different tenants on a shared computing infrastructure including at least one application server apparatus may include associating a tenant with a plurality of services, wherein each service provides a set of actions that the service is configured to perform. In some embodiments, the method may include associating at least one tenant runlevel for each associated service with the tenant. In various embodiments, the method may include, when the application server apparatus executes a service for the tenant, determining the tenant runlevel associated with the tenant, and managing the set of actions configured to be performed by the service based at least in part upon the tenant runlevel associated with the tenant and the service.

20 Claims, 10 Drawing Sheets

(56) References Cited

U.S. PATENT DOCUMENTS

| | | | |
|---|---|---|---|
| 9,031,223 B2* | 5/2015 | Smith | H04M 3/5141 379/265.01 |
| 9,043,458 B2* | 5/2015 | Balaji | H04L 67/2833 709/217 |
| 9,081,805 B1* | 7/2015 | Stamen | G06F 17/30297 |
| 9,420,034 B2* | 8/2016 | Cai | H04L 67/10 |
| 9,495,372 B2* | 11/2016 | Venkataraman | G06F 17/30091 |
| 2002/0124168 A1* | 9/2002 | Mccown | G06F 21/10 713/166 |
| 2002/0165864 A1* | 11/2002 | Azagury et al. | 707/10 |
| 2002/0174422 A1* | 11/2002 | Kelley et al. | 717/178 |
| 2003/0171831 A1* | 9/2003 | Wucherer | G05B 19/414 700/61 |
| 2005/0021784 A1* | 1/2005 | Prehofer | H04L 29/06 709/229 |
| 2007/0294426 A1* | 12/2007 | Huang et al. | 709/234 |
| 2008/0086482 A1* | 4/2008 | Weissman | G06F 21/6218 |
| 2008/0168139 A1* | 7/2008 | Junuzovic | H04L 67/02 709/205 |
| 2009/0049056 A1* | 2/2009 | Shutt | G06F 17/30575 |
| 2009/0210514 A1* | 8/2009 | Davis | G06F 17/30905 709/219 |
| 2010/0005443 A1* | 1/2010 | Kwok | G06Q 10/10 717/100 |
| 2010/0023937 A1* | 1/2010 | Kothari | G06F 9/44505 717/170 |
| 2010/0058486 A1* | 3/2010 | Wilson et al. | 726/28 |
| 2010/0211989 A1* | 8/2010 | Julisch | G06F 21/604 726/1 |
| 2011/0051932 A1* | 3/2011 | Hoover et al. | 380/270 |
| 2011/0138027 A1* | 6/2011 | Friedmann | G06F 9/52 709/223 |

* cited by examiner

|  |  | Login Service Runlevel Value 420 | Batch Service Runlevel Value 424 |
|---|---|---|---|
| 402 | Running | 6 | 2 |
| 404 | Stopping | 6 | 0 |
| 406 | Prepare Finalizing | 6 | 0 |
| 408 | Finalizing | 6 | 0 |
| 410 | Prepare Stopped | 6 | 0 |
| 412 | Stopped | 0 | 0 |
| 414 | Admin | 2 | 1 |

FIG. 4b 401a

|  |  | Login Service Runlevel Value 420 | Batch Service Runlevel Value 424 |
|---|---|---|---|
| 402a | Running | 6 | 2 |
| 404a | Stopping | 6 | 1 |
| 406a | Prepare Finalizing | 6 | 0 |
| 408a | Finalizing | 2 | 0 |
| 410a | Prepare Stopped | 2 | 0 |
| 412a | Stopped | 0 | 0 |
| 414a | Admin | 2 | 2 |

FIG. 4c 403

|  | Service 452 | Runlevel Value 454 | Action Limitation 456 |
|---|---|---|---|
| 462 | Login | 6 | Allow all users to login |
| 464 | Login | 2 | Allow only administrators to login |
| 466 | Login | 0 | Allow no one to login |
| 472 | Batch Processing | 2 | Start any batch jobs |
| 474 | Batch Processing | 1 | Start only technical batch jobs |
| 476 | Batch Processing | 0 | Start no batch jobs |

FIG. 5
500

502 Associating a tenant with a plurality of services, wherein each service provides a set of actions that the service is configured to perform

504 Associating at least one tenant runlevel for each associated service with the tenant

506 Providing a plurality of service runlevels, wherein each service runlevel includes one or more limitations regarding the set of actions that the service can perform

508 When the application server apparatus executes a service for the tenant, determining the tenant runlevel associated with the tenant

510 Executing the service or an instantiation of the service for the tenant with a service runlevel based at least in part upon the tenant's tenant runlevel

512 Managing the set of actions configured to be performed by the service based at least in part upon the tenant runlevel associated with the tenant and the service

514 Changing the tenant runlevel associated with a tenant at a plurality of application server apparatuses substantially simultaneously

| 602 Service Runlevel Framework |
|---|
| 604 Procedures<br>Set Service Runlevel (in tenant: int, in service: char, in service_runlevel: int, in permanent: bool)<br>Get Service Runlevel (in tenant: int, in service: char) : int |

---

| 612 Tenant Runlevel Framework |
|---|
| 614 Procedures<br>Set Tenant Runlevel (in tenant: int, in runlevel: int, in timeout time: int, in timeout date: int,<br>in next runlevel: int)<br>Get Service Runlevel (in tenant: int, out tenant runlevel: char, out next runlevel: char,<br>out timeout time: int, timeout date: int,<br>out changed by: char, out changed time: int, out changed date: int) |

---

| 622 Excluded Tenants |
|---|
| 624 Procedures<br>Add Tenant (in tenant: int, in reason: int)<br>isExcluded (in tenant: int)<br>Remove Tenant (in tenant: int) |

700

800

900

1000

APPLICATION SERVER RUNLEVEL FRAMEWORK

TECHNICAL FIELD

This description relates to multi-tenancy services and more specifically to the management of a service on a multi-tenancy system, server or apparatus.

BACKGROUND

Traditionally, large infrastructure level software applications have been locally installed and executed on a customer's computing machine, either as a stand-alone application or as an internal client-server system. Alternatively, a customer may purchase a mainframe or multi-headed system in which the application is executed by a single centralized machine and multiple users may access the machine via a plurality of individual keyboards and screens (colloquially referred to as "heads").

Software as a service (SAAS) is a model of software deployment where an application is hosted, in whole or part, as a service provided to customers across a network (e.g., the Internet, etc.). By eliminating the need to install and run the entire application on the customer's own computer, SAAS often alleviates the customer's burden of software maintenance, ongoing operation, and support. Conversely, customers often relinquish control over the software. Also, using SAAS can typically reduce the up-front expense of software purchases, through less costly, often on-demand pricing. From the software vendor's standpoint, SAAS has the attraction of providing stronger protection of its intellectual property, establishing an ongoing revenue stream, and attracting customers who might traditionally be priced out of the market. In general, a SAAS software vendor may host the application on its own server, or this function may be handled by a third-party application service provider (ASP).

Enterprise resource planning (ERP) is typically the planning of how business resources (e.g., inventory, employees, customers, etc.) are acquired and flow through the business process associated with each resource. Frequently, ERP includes the capture, storage and analysis of information relating to the tracked resources. In various cases ERP may be divided into sub-categories or systems pertaining to financials, human capital management, materials management, customer relationship management, sales & distribution, and production planning, corporate services, and/or general operations management. In general, a well executed ERP system enhances productivity and provides insight to a business. Often an ERP customer may wish to keep their ERP data secret from their competitors and more generally the world.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a customer may wish to keep their customer relationship management data secret from their competitors and more generally the world.

SUMMARY

According to one general aspect, a method for managing a plurality of different tenants on a shared computing infrastructure including at least one application server apparatus may include associating a tenant with a plurality of services, wherein each service provides a set of actions that the service is configured to perform. In some embodiments, the method may include associating at least one tenant runlevel for each associated service with the tenant. In various embodiments, the method may include, when the application server apparatus executes a service for the tenant, determining the tenant runlevel associated with the tenant, and managing the set of actions configured to be performed by the service based at least in part upon the tenant runlevel associated with the tenant and the service.

According to another general aspect, an apparatus may be configured to service a plurality of different tenants within a shared computing infrastructure. The apparatus may include a processor and a runlevel manager. In one embodiment, the processor may be configured to associate a tenant with at least one service, wherein each service provides a set of actions that the service is configured to perform, and execute an instantiation of the service for the tenant. The runlevel manager configured to associate at least one tenant runlevel for each associated service with the tenant, and when the processor executes the instantiation of the service for the tenant, determine the tenant runlevel associated with the tenant. The processor may further be configured to manage the set of actions configured to be performed by the service based at least in part upon the tenant runlevel associated with the tenant and the service.

According to another general aspect, a multi-tenant application may include at least one service including at least one service runlevel and configured to be executed for a tenant associated with at least one tenant runlevel. The multi-tenant application may include an application programmable interface (API) having a tenant runlevel determination procedure configured to take as input a tenant identifier representing a tenant, and provide a tenant runlevel currently associated with the tenant.

The details of one or more implementations are set forth in the accompanying drawings and the description below. Other features will be apparent from the description and drawings, and from the claims.

A system and/or method for multi-tenancy services, substantially as shown in and/or described in connection with at least one of the figures, as set forth more completely in the claims.

BRIEF DESCRIPTION OF THE DRAWINGS

FIG. 4 is a series of tables of example embodiments of data in accordance with the disclosed subject matter.

FIG. 5 is a flow chart of an example embodiment of a technique in accordance with the disclosed subject matter.

FIG. 6 is a block diagram of an example embodiment of an application programming interface (API) in accordance with the disclosed subject matter.

Like reference symbols in the various drawings indicate like elements.

DETAILED DESCRIPTION

In various embodiments, multi-tenancy may be an architectural principle, wherein a single instance of a software program runs or executes on a software-as-a-service (SAAS) vendor's servers, serving multiple client organizations or tenants. In one embodiment of the multi tenant architectural concept, a software application may be designed to virtually partition its data and/or configuration so that each tenant works with a customized virtual application instance. Each tenant has a virtual "view" of the data and/or processes related to that tenant. Multi-tenant architecture is designed, in various embodiments, to allow tenant-specific configurations of the user interface (UI) (e.g., branding, etc.), business processes and data models. In some embodiments, such customization and partitioning may be enabled without changing the service software. In such an embodiment, the same service software may be shared by all tenants; therefore, transforming system customization into system configuration.

Figure 2:
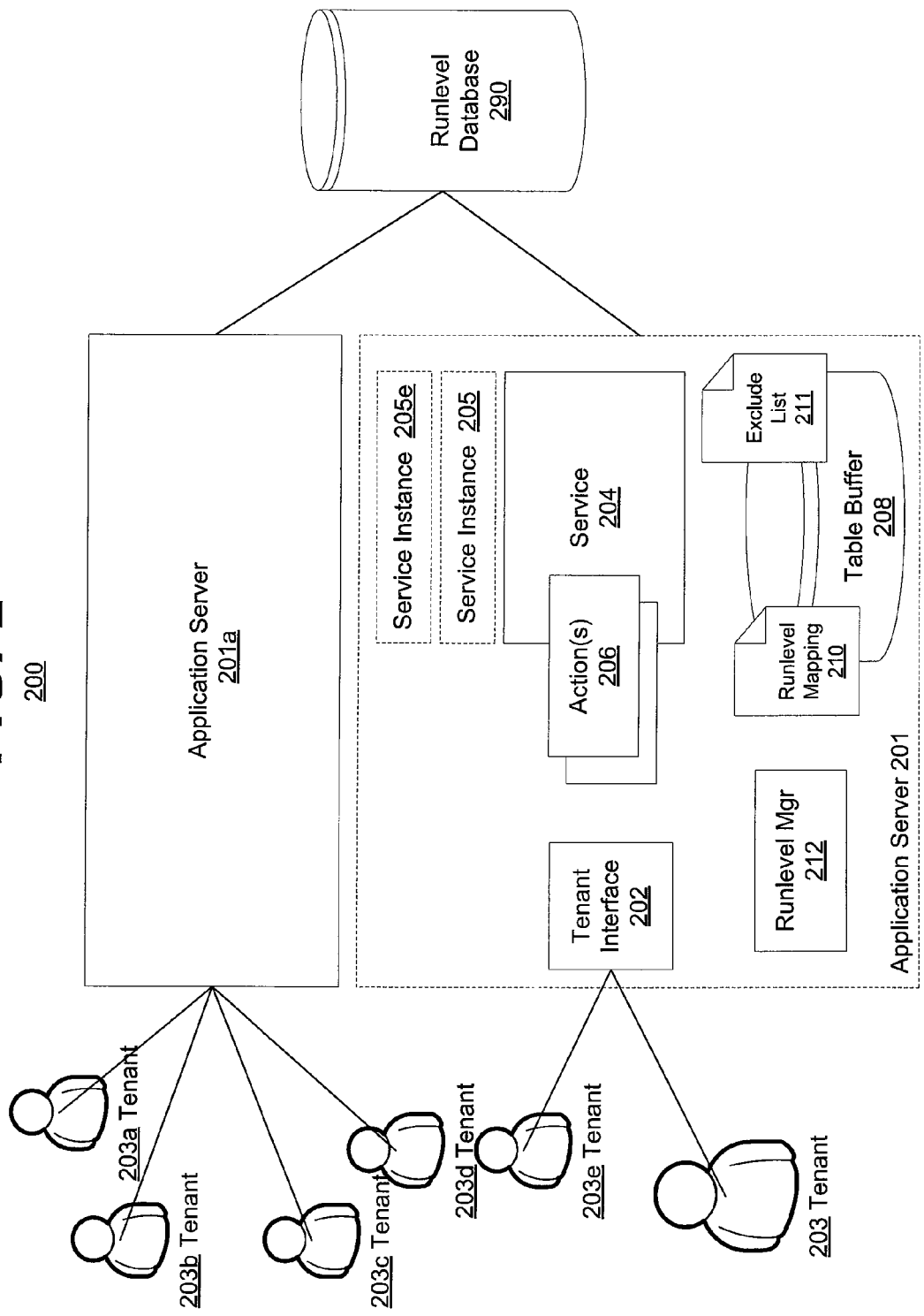
FIG. 2 is a block diagram of an example embodiment of a system in accordance with the disclosed subject matter.

FIG. 2 is a block diagram of an example embodiment of a system 200 in accordance with the disclosed subject matter. In one embodiment, the system 200 may include a plurality of application servers (e.g., application server 201 and 201*a*). In such an embodiment, these application servers 201 may service a plurality of tenants 203, 203*a*, 203*b*, 203*c*, and 203*d*. In some embodiments, these application servers 201 may share a runlevel database 290.

In various embodiments, an application server 201 may include or provide a service 204 or software application that provides or is configured to perform a set of actions 206 (e.g., log users into the service, execute data reporting jobs, track customer information, update inventory status, etc.). A given tenant 203 may access a number of services 204 and their respective sets of actions or functionality 206 during the course of a normal business transaction (e.g., updating inventory, performing a sales meeting, etc.).

It is understood that these various services 204 may be housed or provided by multiple application servers 201, collectively referred to as a shared computing infrastructure (e.g., system 200). Further, in some embodiments, a plurality of application servers 201 may all provide the same service 204, but be arranged in a load balancing, or other configuration. While the primary illustrated application server 201 only illustrates two tenants 203 and 203*e* and a single service 204, it is understood that this is merely a simplified diagram and that other more complex embodiments are considered. For example, application server 201*a* is explicitly shown servicing a plurality of tenants 203*a*, 203*b*, 203*c*, and 203*d*.

As described above, in one embodiment of the multi tenant architectural concept, a software application or service 204 may be designed to virtually partition its data and/or configuration so that each tenant works with a customized virtual application instance. In such an embodiment, a first tenant 203 may be utilizing a first portion of the set of actions 206 while a second tenant 203*e* is utilizing a second portion of the set of actions 206. Nevertheless both tenants 203 and 203*e* may be executing or accessing service 204.

However, in one embodiment, the first tenant 203 may be performing an action via service 204 (e.g., shutting the service down) that, in a single tenant system (e.g., a personal computer) would conflict with the action performed by the second tenant 203*e* via the service 204 (e.g., the second tenant 203*e* may be running a report). Therefore, not only may it be desirable to partition data between tenants 203, but also partition the instantiations of the service 204 experienced by the tenants 203. In one embodiment, this partitioning of service 204 instantiations may be accomplished by altering the effective runlevel at which the service 204 or the tenant's virtualized instantiation of service 204 is executed.

Traditionally, the term "runlevel" refers to a mode of operation in a computer software (e.g., an operating system) is executed. Colloquially, one refers to the software as being executed at a given runlevel. Traditionally, runlevels are given values often numerical (e.g. runlevel 1, etc.).

In one embodiment, each service 204 may be configured to support or include a plurality of runlevels or modes of operation. In each runlevel a portion or all of the set of actions 206 may be allowed or supported. In another embodiment, in each runlevel different restrictions may be placed upon each of the actions 206. For example, the service 204 may provide a first or general runlevel (e.g., runlevel 6) in which all non-administrative actions 206 are allowed and may be performed or executed, but actions 206 deemed "administrative" or only for highly trusted users may not be performed. The service 204 may also provide a second or administrative runlevel (e.g., runlevel 2) in which all actions 206 (including non-administrative actions) are allowed and may be performed or executed. In such an embodiment, the service 204 may provide support for managing a user's actions based upon a runlevel.

In various embodiments, each tenant 203 may be associated with a plurality of services 204. Is it understood that various tenants 203 may be associated with different services 204, but for purposes of illustration it will be assumed that in this embodiment all tenants (e.g., tenant 203, 230*a*, etc.) are associated with the same services 204.

As described above, various tenants 203 may wish to execute a service 204 with different runlevels. For example, tenant 203 may wish to only allow administrative actions 206, while tenant 203*e* wishes to only allow non-administrative actions 206. In such an embodiment, the application server 201 may execute a first instance 205 of the service 204 for the first tenant 203, in which the service instance 205 is executed at the first administrative runlevel. Also, the application server 201 may execute a second instance 205*e* of the service 204 for the second tenant 203*e*, in which the service instance 205*e* is executed at the second non-administrative runlevel.

In one embodiment, the application server 201 may associate a tenant 203 with a plurality of services (e.g., service 204). The application server 201 or a runlevel manager 212 included by the application server 201 may be configured to associate each tenant (e.g., tenants 203, 203*e*, 203*a*, 203*b*, etc.) with individual service runlevels for each service 204. In such an embodiment, when a tenant (e.g., tenant 203*e*) wishes to execute a service 204, its service instantiation 205*e* may be executed with the service runlevel associated with tenant 203*e*, and not the service runlevel associated with another tenant (e.g., tenant 203). In such an embodiment, different tenants 203 may operate or execute a service 204 using or employing different service runlevels.

In various embodiments, much as a service 204 may provide a plurality of service runlevels, a tenant 203 may wish to provide a plurality of tenant runlevels that govern or manage the way users (not shown) interact with the service 204 or the actions 206 provided by the service 204. As described in more detail below in FIG. 3, in one example a tenant 203 may change runlevels or operating modes as part of a systematic process. For example, various tenant runlevels may include "running", "stopping", "finalizing", "stopped", "administrate-use-only", etc. Each tenant runlevel may dictate the set of actions 206 that may be performed and/or the type of users (e.g., administrators, normal users, etc.) that may perform or request the performance of the actions 206.

In various embodiments, each tenant runlevel may be associated with one or more service runlevels. For example, in one embodiment, if a tenant 203 is interacting with the application server 201 and at a first tenant runlevel (e.g., "running") the service 204 (or instantiation thereof) may be executed at a first runlevel (e.g., non-administrative actions 206). However, if tenant 203 is interacting with the application server 201 and at a second tenant runlevel (e.g., "stopping") the service 204 (or instantiation thereof) may be executed at or change execution mode to a second runlevel (e.g., administrative actions 206). Likewise, a second tenant (e.g., tenant 203e) may have its own set of service runlevels associated with each of its, tenant 203e, tenant runlevels.

In various embodiments, these tenant-to-service runlevel associations may be maintained or accessed by the runlevel manager 212 via a runlevel mapping file 210. One embodiment of a runlevel mapping file 210 is illustrated by Tables 401 and 401a of FIG. 4.

In some embodiments, such a runlevel mapping file 210 may be stored or cached within a table buffer 208. In various embodiments, the table buffer 208 may include a set or portion of locally cached or buffered database records or tables. These original or non-cached database records or tables of the table buffer 208 may be stored within a centralized runlevel database 290. In some embodiments, the runlevel database 290 may also include non-runlevel information (e.g., tenant data as described above, etc.). In various embodiments, by caching or buffering the table buffer 208 locally the time to access the information may be reduced.

In various embodiments, the common or centralized runlevel database 290 may be configured to provide a plurality of application servers 201 and/or service 204 with tenant and service runlevel information (e.g., runlevel definitions, tenant and service runlevel associations, etc.). In such an embodiment, it may be desirable to provide this information in a coherent manner, such that that data locality cached by two application servers (e.g., applicant servers 201 and 201a) is substantially the same and consistent. For example, a tenant (e.g., tenant 203e) may be moved from a first application server 201 to a second application server 201a (e.g., for load balancing reasons, etc.). It may be undesirable for the privileges or runlevel of the tenant 203e to change as a result of being moved between servers 201. In such an embodiment, centralized runlevel database 290 may be configured to provide plurality of application servers 201 and/or service 204 with coherent tenant and service runlevel information.

In one embodiment, if a tenant runlevel, service runlevel, or the association between the two changes on a given application server 201, the common or centralized runlevel database 290 may be configured to update the relevant information cached by the plurality of application servers in a substantially simultaneous manner. In one embodiment, this may include a synchronous updating protocol. In various embodiments, the runlevels, their definitions, and associations may be queried or altered via a programmatic interface, as described in relation to FIGS. 7, 8, 9, and 10.

In various embodiments, the application service 201, runlevel database 290, and/or table buffer 208 may include a list 211 of tenants that are excluded from using or executing a service 204. For example, this list may include a tenant 203 that have not paid the fees to use the service 204; although, it is understood that the above is merely one illustrative example to which the disclosed subject matter is not limited. In some embodiments, the excluded tenants list 211 may include a list of tenants that are not fully excluded but merely restricted (e.g., trial period tenants, maintenance-only mode tenants, etc.). In some embodiments, this excluded tenants list 211 may be included as part of the runlevel mapping 210 information. For example an excluded tenant may be listed or associated with only non-operative runlevels.

In various embodiments, a given tenant or service runlevel may be overridden. For example, an administrator or otherwise privileged user (not shown) of the application server 201 (e.g., a designer of the service 204, the support staff of company providing the application server 201) may alter, temporarily or permanently, the runlevel experienced by either a tenant 203, a service 204, or an instantiation of the service 205, etc. In one embodiment, a tenant 203 may contact the support staff of company providing the application server 201 regarding a problem. In response the support staff, in order to solve the tenant's 203 problem, may override the tenant and/or service runlevel(s) found within the table buffer 208, etc. If such a change in runlevel solves the issue the support staff may alter the tenant and/or service runlevel associations in a more permanent manner (e.g., editing the runlevel mapping 210), which may then be propagated back to the runlevel database 290 and any other application server (e.g. application server 201a).

Figure 3:
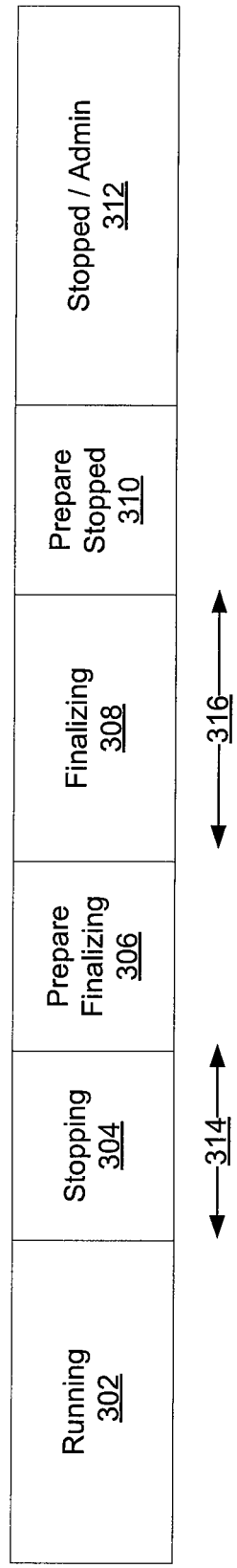
FIG. 3 is a timing diagram of an example embodiment of a series of events in accordance with the disclosed subject matter.

FIG. 3 is a timing diagram of an example embodiment of a series 300 of events in accordance with the disclosed subject matter. In various embodiments, these events or runlevels may be experienced by a multi-tenant system such as system 200 of FIG. 2. These tenant runlevels may cause changes to the underlying service runlevels. This is better illustrated by FIG. 4 below.

In one embodiment, a tenant may have or include at least six tenant runlevel states. Although, it is understood that the above are merely a few illustrative examples to which the disclosed subject matter is not limited. In such an embodiment, the states may include Running 302, Stopping 304, Prepare Finalizing 306, Finalizing 308, Prepare Stopped 310, and Stopped or Admin 312.

In various embodiments, these tenant runlevels may be expected to execute one after the other, producing a shutdown sequence of events. Likewise, another series of tenant runlevels may be expected to occur when the tenant starts or initializes. In such an embodiment, each tenant runlevel may specify another tenant runlevel to execute after the current tenant runlevel is finished.

In one embodiment, the tenant may start, for purposes of this example, in a running state or runlevel 302. In the Running runlevel 302 the tenant may configure the services to execute without any limitations. At some point the tenant, a privileged user thereof, or an agent of the entity providing the hosted multi-tenant services used by the tenant may determine that the tenant should shutdown or be stopped (for example, the tenant may be being moved to another application server, and require maintenance, etc.).

The Stopping tenant runlevel 304 may be configured to disable the start of long-running activities or actions by the service or instantiations thereof. In one embodiment, the Stopping tenant runlevel 304 may be expected to last for 10-60 minutes (for example), but this time expectation may not be enforced. Further, at this tenant runlevel 304 the service may be configured to prevent logins from the tenant's users, except for tenant administrators, and to disallow or prevent the starting of batch jobs; although, it is understood that the above are merely a few illustrative examples to which the disclosed subject matter is not limited.

In various embodiments, the amount of time a tenant may be within this tenant runlevel 314 may be limited (e.g., to 45 minutes). In such an embodiment, a timer may count down (or up) until the predetermined amount of time has passed, at which point the tenant may automatically transition to a next tenant runlevel defined by the Prepare Finalizing tenant runlevel 306 (Finalizing tenant runlevel 308).

In other embodiments, other events may be used or employed to trigger the transitioning between a first and a second runlevel, tenant or service. Some example events may include, but are not limited to, a predetermined date, a value in a file, the completion of an action, a certain number of log-in users, etc.; it is understood that the above are merely a few illustrative examples to which the disclosed subject matter is not limited.

The Prepare Finalizing tenant runlevel 306 may be configured to prepare the tenant and services for the Finalizing tenant runlevel 308. In such an embodiment, at this tenant runlevel 306 the service may be configured to (via a change in service runlevel) expel or forcibly logout users from the system, tenant or service. In one embodiment, this tenant runlevel 306 may include a time element 314.

The Finalizing tenant runlevel 308 may be configured to finalize any pending actions performed by the service for the tenant. Such actions may include disabling the start of any new activities or actions and shutting down or terminating any existing actions, rejecting any incoming messages for the service/tenant, and waiting for any pending updates, etc. to come to an end, etc.

The time event 316 illustrates that the Finalizing tenant runlevel 308 may end due to a predetermined event, time event 316 (e.g., 5 minutes). However, in various embodiments, the Finalizing tenant runlevel 308 may end due to another event, for example, the completion of all pending or active actions. In one embodiment, the time event 316 may act as a "fail-safe" to assure termination of the Finalizing tenant runlevel 308 even if one or more pending or active actions never complete. It is understood that the above are merely a few illustrative examples to which the disclosed subject matter is not limited.

The Prepare Stopped tenant runlevel 310 may be configured to prepare the tenant and services for the Stopped tenant runlevel 312. In such an embodiment, at this tenant runlevel 310 the service may be configured to (via a change in service runlevel) notify all frameworks or services to record any possible need for clean-up services, call any registered callback actions in order to prepare components for stopped state, and kill all remaining sessions. However, in some embodiments, these managed service actions may be part of the Finalizing tenant runlevel 308.

The Stopped tenant runlevel 312 may be configured to prevent any actions or activity from occurring by a service for the tenant. Also illustrated is a possible alternate Admin runlevel in which the actions may be limited only being performed by administrative users of the tenant. For example, login may be restricted to administrative or privileged users, allow or provide only clean-up or administrative tasks, disallow or not provide no autonomous activities, reject any incoming messages, and automatically turn off or disable any schedulers off (although, they may be individually enabled if desired), etc. It is understood that the above are merely a few illustrative examples to which the disclosed subject matter is not limited.

FIG. 4 is a series of tables 401, 401a, and 403 of example embodiments of data in accordance with the disclosed subject matter. In one embodiment, a system (e.g., system 200 of FIG. 2) may include a plurality of tenants. Each of these tenants may be associated with or include a tenant runlevel that dictates or manages how actions or services operate or execute on behalf of the tenant during the given tenant runlevel. Likewise, each service or instantiation thereof may include a plurality of service runlevels that dictates or manages how actions are performed or executed during the runtime or execution period of the service.

FIG. 4a illustrates an embodiment of a table 401 for a first tenant. In the illustrated embodiment, the tenant may include or have at least seven tenant runlevels: Running 402, Stopping 404, Prepare Finalizing 406, Finalizing 408, Prepare Stopped 410, Stopped 412, and Admin 414; although, it is understood that the above are merely a few illustrative examples to which the disclosed subject matter is not limited. This tenant may also be associated with at least two services: the Login service (represented by column 420) and the Batch service (represented by column 424).

Table 401 illustrates that for each tenant runlevel (e.g., Running 402) the tenant's instantiation of the respective service is expected to execute or operate at a given runlevel (e.g., Login service executes at runlevel 6, and the Batch service executes at runlevel 2). It is understood that the service runlevel values are merely arbitrary illustrative examples to which the disclosed subject matter is not limited.

Table 401 illustrates that if the tenant runlevel changes (e.g., from Running 402 to Stopping 404) the tenant's instantiation of the respective service is expected to change the runlevel of the respective services (e.g., Login service continues to execute at runlevel 6, but the Batch service now executes at runlevel 0).

FIG. 4b illustrates an embodiment of a table 401a for a second tenant. In the illustrated embodiment, the tenant may include or have at least seven tenant runlevels: Running 402a, Stopping 404a, Prepare Finalizing 406a, Finalizing 408a, Prepare Stopped 410a, Stopped 412a, and Admin 414a. This tenant may also be associated with at least two services: the Login service (represented by column 420) and the Batch service (represented by column 424).

It is noted that the first and second tenants may differ in the service runlevels they expect their respective instantiations of the services to execute at. For example, the second tenant may only allow administrators to login (service runlevel 2 464) during the Finalizing tenant runlevel. In such a way each tenant may manage their respective services and the operation thereof, not just temporally (i.e. which tenant runlevel a tenant is operating at), but by service level within a given tenant runlevel.

While the two tenants are illustrated as using or employing the same tenant runlevels and services (e.g. login and batch) this need not always be the case. It is contemplated that some tenants may employ different services or define various different tenant runlevels.

In various embodiments, the tables 401 and 401a may be included by a runlevel mapping file (e.g. runlevel mapping file 210 of FIG. 2), a table buffer or cache, or a common or centralized database. In another embodiment, these tables or either functional equivalents may be included by metadata associated with the tenant.

FIG. 4c illustrates a table 403 showing various service runlevel definitions for two services (login and batch processing). Column 452 displays the service. Column 454 displays the runlevel value, which in this case is numeric. It is also shown that a given runlevel value may be common to a number of services but mean different things to that service and that service runlevels are not necessarily "across the board" values which apply to all services of a tenant, but to each service on a case-by-case basis. Although, a tenant may wish to set all services to a given runlevel. Column 456 displays the limitations or type of management applied to the set of actions performed by the respective service.

For example, row 462 shows that when the Login service (or an instantiation thereof) is executed at the service runlevel 6, all users may login. However if the Login service is changed to or executed at runlevel 2 (row 464) only administrators will be allowed to login. Continuing, row 466 illustrates that at Login service runlevel 0 no one may login. Row 472 illustrates that at Batch Processing service runlevel 2 any batch file may be started. Row 474 illustrates that at Batch Processing service runlevel 1 only technical or administrative batch file may be started. Row 476 illustrates that at Batch Processing service runlevel 0 no batch file may be started. Other limitations or management settings may exist for each action provided by the respective service, but are not illustrated.

FIG. 5 is a flow chart of an example embodiment of a technique 500 in accordance with the disclosed subject matter. In various embodiments, the technique 500 may be used or produced by the systems such as those of FIG. 1 or 2. Furthermore, portions of technique 500 may be used or produced by the tables, API, or procedures such as that of FIG. 4, 6, 7, 8, 9, or 10. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a tenant may be associated with a plurality of services, as described above. In some embodiments, each service may provide a set of actions that the service is configured to perform, as described above. In various embodiments, one or more of the action(s) illustrated by this Block may be performed by the apparatuses or systems of FIG. 2, for example the table buffer 208 or runlevel database 290 of FIG. 2, as described above.

Block 504 illustrates that, in one embodiment, at least one tenant runlevel for each associated service may be associated with the tenant, as described above. In various embodiments, one or more of the action(s) illustrated by this Block may be performed by the apparatuses or systems of FIG. 2, for example the table buffer 208 or runlevel database 290 of FIG. 2 or the tables 401 and 401a of FIG. 4, as described above.

Block 506 illustrates that, in one embodiment, a plurality of service runlevels may be provided, as described above. In various embodiments, each service runlevel may include one or more limitations regarding the set of actions that the service can perform, as described above. In various embodiments, one or more of the action(s) illustrated by this Block may be performed by the apparatuses or systems of FIG. 2, for example the table buffer 208, runlevel database 290 or service 204 of FIG. 2 or table 403 of FIG. 4, as described above.

Block 508 illustrates that, in one embodiment, when an application server apparatus executes a service or instance thereof for the tenant, the tenant runlevel associated with the tenant may be determined, as described above. In one embodiment, determining may include determining if an overriding runlevel is associated with the service or tenant. In such an embodiment, if so, determining may include executing the service at the overriding runlevel, as described above. In various embodiments, one or more of the action(s) illustrated by this Block may be performed by the apparatuses or systems of FIG. 1 or 2, for example the processor 102 of FIG. 1, the runlevel manager 212 of FIG. 2 or tables 401 and 401a of FIG. 4, as described above.

Block 510 illustrates that, in one embodiment, the service or an instantiation of the service may be executed for the tenant with a service runlevel based at least in part upon the tenant's tenant runlevel, as described above. In one embodiment, executing may include executing an instantiation of the service for the tenant with a service runlevel based at least in part upon the tenant's tenant runlevel, and executing another instantiation of the service for another tenant with a service runlevel based at least in part upon the other tenant's tenant runlevel, as described above. In another embodiment, executing may include executing the service for the tenant at a first service runlevel based at least in part upon the tenant's first tenant runlevel, and if the tenant's tenant runlevel changes to a second tenant runlevel, executing the service for the tenant at a second service runlevel, as described above. In various embodiments, one or more of the action(s) illustrated by this Block may be performed by the apparatuses or systems of FIG. 1 or 2, for example the processor 102 of FIG. 1 or tables 401 and 401a of FIG. 4, as described above.

Block 512 illustrates that, in one embodiment, the set of actions configured to be performed by the service may be managed or limited based at least in part upon the tenant runlevel associated with the tenant and the service, as described above. In one embodiment, the set of actions configured to be performed by the service may be managed or limited based upon the service runlevel of the service, which may in turn be based upon the tenant runlevel, as described above. In various embodiments, managing may include, if an overriding runlevel is associated with the service or tenant, managing the set of actions configured to be performed by the service based at least in part upon the overriding runlevel. In another embodiment, managing may include transitioning from a first tenant runlevel to a second tenant runlevel as a result of the occurrence of a predetermined event, as described above. In various embodiments, one or more of the action(s) illustrated by this Block may be performed by the apparatuses or systems of FIG. 1 or 2, for example the processor 102 of FIG. 1, the runlevel manager 212 of FIG. 2 or tables of FIG. 4, as described above.

Block 514 illustrates that, in one embodiment, the tenant runlevel associated with a tenant may be changed at a plurality of application server apparatuses substantially simultaneously, as described above. In various embodiments, the tenant runlevel may be stored in a common database, and cached in at least part by each application server apparatus, as described above. In various embodiments, one or more of the action(s) illustrated by this Block may be performed by the apparatuses or systems of FIG. 1 or 2, for example the processor 102 of FIG. 1, the table buffer 208 and runlevel database 290 of FIG. 2 or tables of FIG. 4, as described above.

FIG. 6 is a block diagram of an example embodiment of application programming interface (API) 600 in accordance with the disclosed subject matter. In various embodiments, an API may include a standardized set of variables and/or functions, procedures, methods, classes or protocols that an operating system, library or service provides to support requests made by various computer programs or applications. In some embodiments, these variables, procedures or classes may be instantiated within a computing system (e.g., a consumer machine, provider machine, etc.) or an application (e.g., a consumer application, provider application, etc.). In one embodiment, the API 600 may include three portions.

A first portion 602 may be for use or to be employed for managing service runlevels similar to that described in FIGS. 2, 4 and 5. In such an embodiment, an application may set or acquire the service runlevel for a service, as described above. In FIG. 5 while the application server 201 or the runlevel manager 212 may employ this API when setting, changing or inquiring about runlevels of a service instantiation (e.g., service instantiation 205).

In such an embodiment, the service runlevel framework 602 may include a "Set Service Runlevel" method or procedure configured to set or change a service runlevel. The method may accept a tenant identifier, a service identifier, and a service runlevel value as inputs. In some embodiments, the method or procedure may also accept a Boolean flag or value indicating if the change in runlevel is substantially permanent (as opposed to transitory and temporary). One embodiment of this method is described in FIG. 10.

The service runlevel framework 602 may also include a "Get Service Runlevel" method or procedure configured to provide a service runlevel currently employed by a service or instance thereof. The method may accept a tenant identifier and a service identifier as inputs, and return a service runlevel value as an output. One embodiment of this method is described in FIG. 9.

A second portion 612 for use or to be employed for managing tenant runlevels similar to that described in FIGS. 2, 3, 4 and 5. The second portion 612 may include procedures 614. In such an embodiment, an application may set or acquire the tenant runlevel for a tenant, as described above. In FIG. 5 while the application server 201 or the runlevel manager 212 may employ this API when setting, changing or inquiring about runlevels of a service instantiation (e.g., service instantiation 205).

The tenant runlevel framework 612 may include a "Set Tenant Runlevel" method or procedure configured to set or change a tenant runlevel. The method may accept a tenant identifier and a tenant runlevel value as inputs. In some embodiments, the method or procedure may also accept a timeout or event identifiers and a next tenant runlevel identifier to which the tenant is to transition once the identifier event or timeout occurs. One embodiment of this method is described in FIG. 7.

The tenant runlevel framework 612 may also include a "Get Tenant Runlevel" method or procedure configured to provide a tenant runlevel currently employed by a tenant. The method may accept a tenant identifier as input and a tenant runlevel identifier as output. In one embodiment, the method may also output any information regarding any events or next tenant runlevels associated with the current tenant runlevel. One embodiment of this method is described in FIG. 8.

A third portion 622 for use or to be employed for excluding tenants from association with a service similar to that described in FIGS. 2 and 5. The third portion 622 may include procedures 624. In such an embodiment, an application may set or acquire information regarding the exclusion of a tenant, as described above. The Excluded Tenants framework 622 may include an "Add Tenant" method or procedure configured to add a tenant to a given service's excluded list. In one embodiment, the method may accept a tenant identifier and a reason identifier detailing why the tenant is excluded (e.g., non-payment, etc.). The Excluded Tenants framework 622 may include an "is Excluded" method or procedure configured to inquire as to whether or not a tenant is part of or on a given service's excluded list. In one embodiment, the method may accept a tenant identifier and return a Boolean flag or value. The Excluded Tenants framework 622 may include a "Remove Tenant" method or procedure configured to remove a tenant from a given service's excluded list. In one embodiment, the method may accept a tenant identifier.

Figure 7:
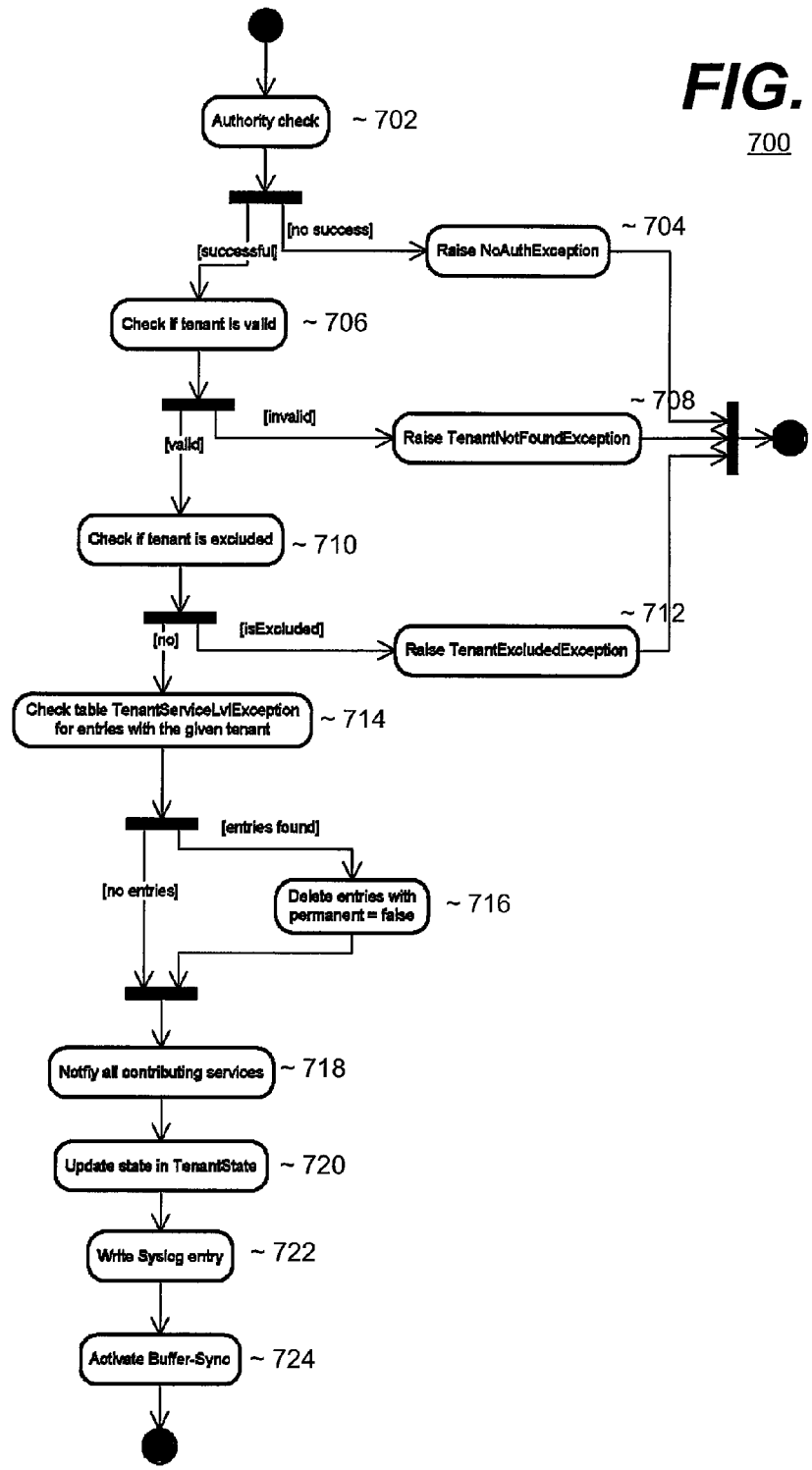
FIG. 7 is a flow chart of an example embodiment of a technique in accordance with the disclosed subject matter.

FIG. 7 is a flow chart of an example embodiment of a technique 700 in accordance with the disclosed subject matter. In one embodiment, the technique may allow an application to set a tenant runlevel of a tenant. Block 702 illustrates that, in one embodiment, the authority of the calling application or user may be checked. If confirmed, Block 706 illustrates that a determination may be made as to whether or not the input tenant or tenant identifier is valid. If so, Block 710 illustrates that a determination may be made as to whether or not the input tenant or tenant identifier is excluded (via a tenant exclusion list) from the service providing or associated with technique 700. Blocks 704, 708, and 712 illustrate that if the above determinations are negative and exception or error may be generated.

Block 714 illustrates that a determination may be made as to whether or not the tenant is authorized to execute the service providing or associated with technique 700 at a specialized runlevel (e.g., a temporary service runlevel as described in the service support example of FIG. 2). If so, Block 716 shows the specialized runlevel may be removed from any such exception list if the exception is not marked as permanent or is marked as temporary. Block 718 shows that any contributing or effected services (e.g., services associated with the tenant) may be notified. Block 720 illustrates that the tenant runlevel may be updated. Block 722 illustrates that a log or other note keeping entry may be made indicating the change. Block 724 illustrates that the table buffer or common centralized database may be updated with the new tenant runlevel information. Although, it is understood that the above are merely a few illustrative examples to which the disclosed subject matter is not limited.

Figure 8:
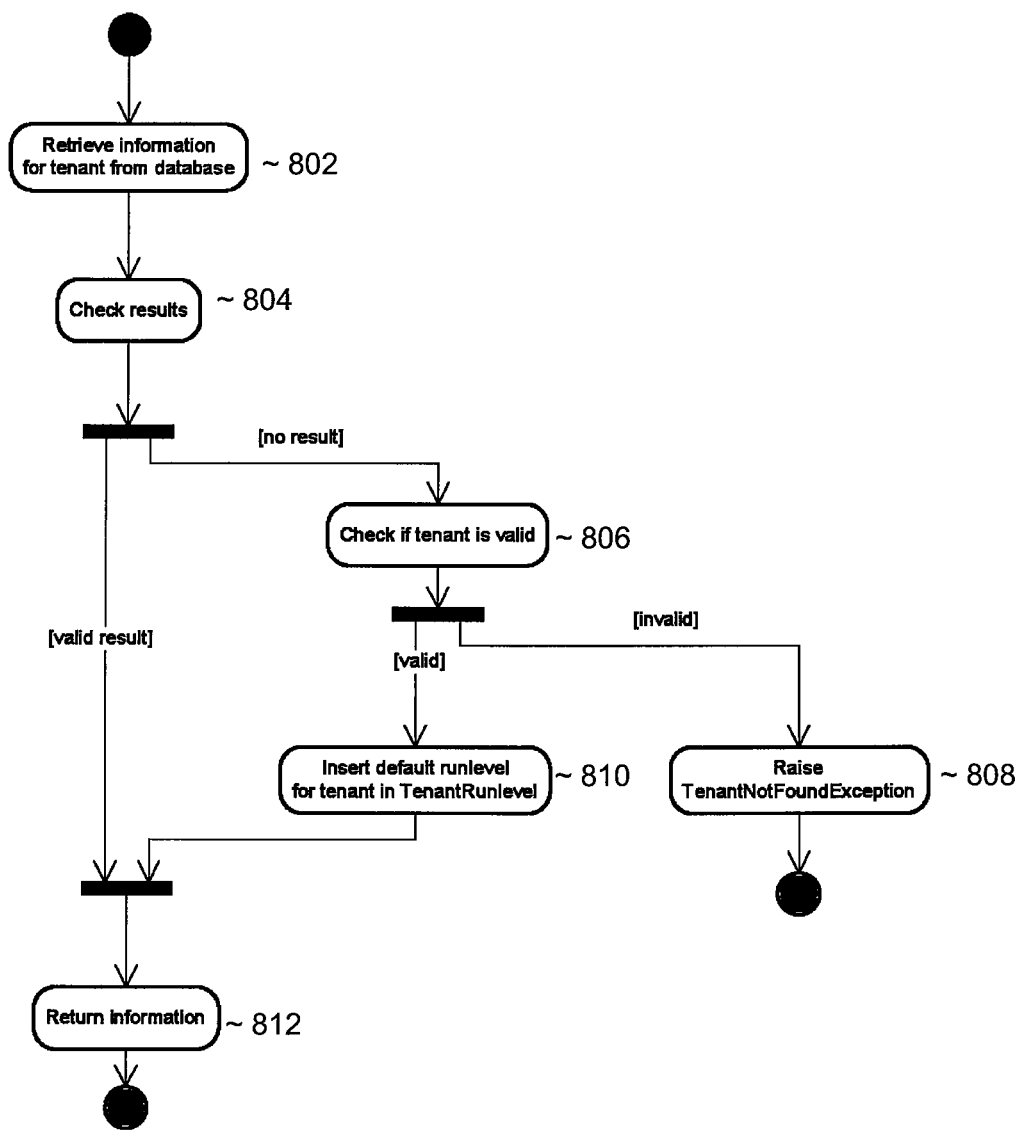
FIG. 8 is a flow chart of an example embodiment of a technique in accordance with the disclosed subject matter.

FIG. 8 is a flow chart of an example embodiment of a technique 800 in accordance with the disclosed subject matter. In one embodiment, the technique may allow an application to get or inquire about a tenant runlevel of a tenant. Block 802 illustrates that, in one embodiment, information regarding the tenant may be retrieved from a table or database (e.g., a table buffer, common database, etc.). Block 804 shows that the validity of the retrieved information may be confirmed, given a predetermined set of validation criteria. Block 806 shows that if no results were returned from database, a determination may be made as to whether or not the input tenant is valid. Block 810 shows that if the input tenant is valid a default tenant runlevel may be returned via Block 812. Otherwise, an exception or error may be returned via Block 808.

Figure 9:
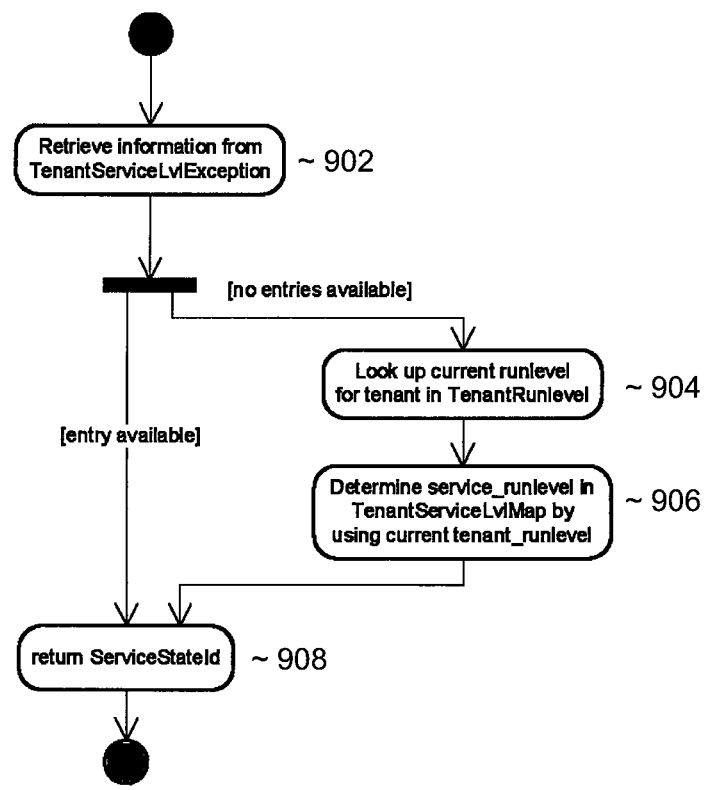
FIG. 9 is a flow chart of an example embodiment of a technique in accordance with the disclosed subject matter.

FIG. 9 is a flow chart of an example embodiment of a technique 900 in accordance with the disclosed subject matter. In one embodiment, the technique may allow an application to get or inquire about a service runlevel of a service, or instance thereof. Block 902 illustrates that, in one embodiment, a determination may be made as to whether or not the tenant is recognized as having an exception or overridden service runlevel (e.g., the support example of FIG. 2). In some embodiments, this may include tracking tenant and service runlevel exceptions or override values via a table or database. Block 908 shows that if an exception or override value exists the overriding service runlevel is returned. Block 904 illustrates that, if not, current tenant runlevel associated with the input tenant or tenant identifier is determined. Block 906 illustrates that, in one embodiment, this tenant runlevel may be looked up in the runlevel mapping file or table (e.g., Table 401 of FIG. 4a) to determine the appropriate or dictated service runlevel, which may be returned or output via Block 908.

Figure 10:
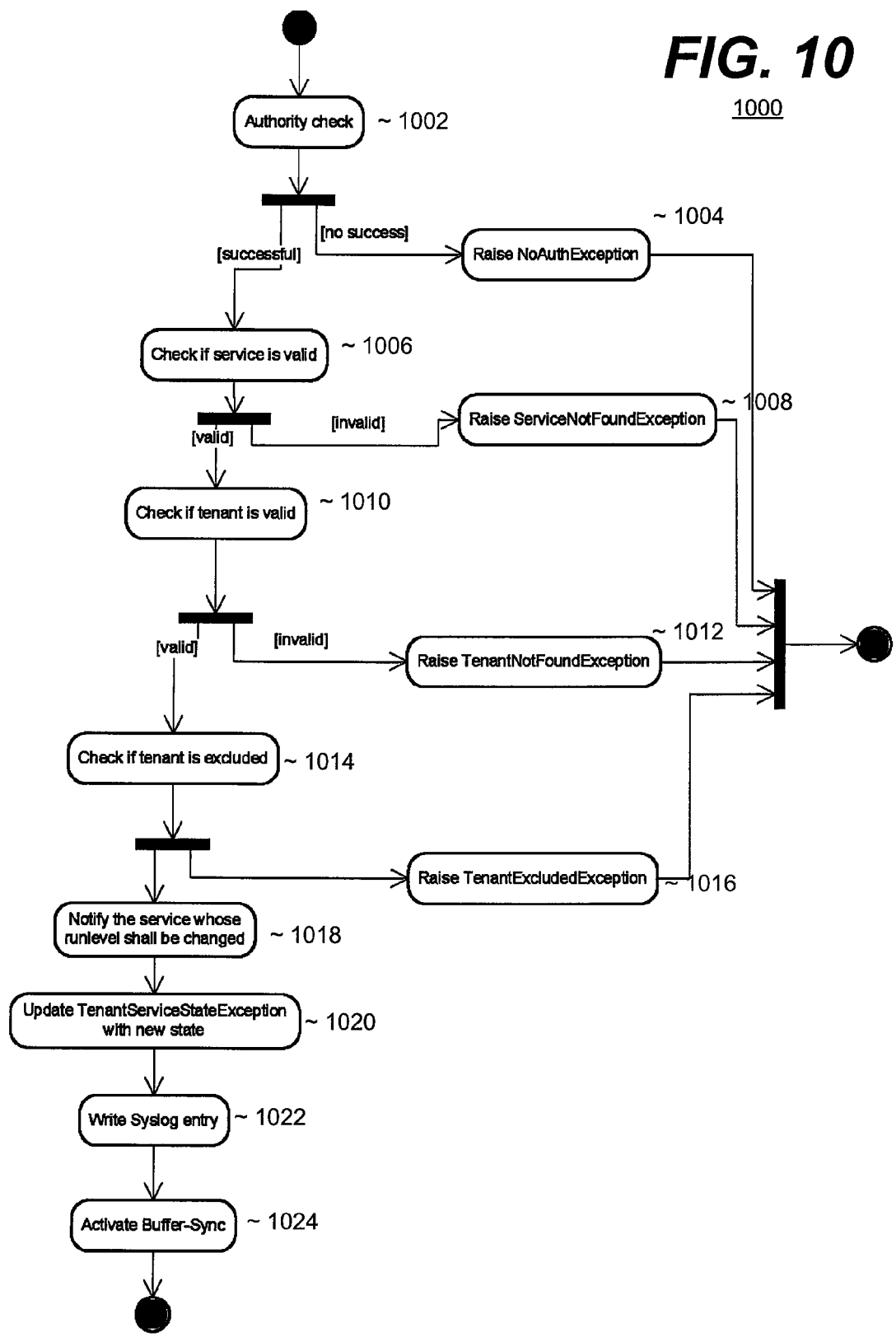
FIG. 10 is a flow chart of an example embodiment of a technique in accordance with the disclosed subject matter.

FIG. 10 is a flow chart of an example embodiment of a technique 1000 in accordance with the disclosed subject matter. In one embodiment, the technique 1000 may allow an application to set a service runlevel of a service, or instance thereof.

Block 1002 illustrates that, in one embodiment, a determination may be made as to whether or not the calling application or user includes the necessary authority to set the service runlevel. Block 1006 shows that a determination may be made as to whether or not the input service is valid. Block 1010 shows that a determination may be made as to whether or not the input tenant is valid. Block 1014 shows that a determination may be made as to whether or not the input tenant is excluded from being associated with the input service, as described above. Blocks 1004, 1008, 1012, and 116 illustrate that if any of these determinations are negative or adverse an exception or error may be generated.

Block 1018 illustrates that, in one embodiment, the input service whose service runlevel is being changed is notified. Block 1020 shows that an entry may be made in a tenant/service runlevel exception list indicating that the service runlevel for the input tenant has been modified. Block 1022 shows that an entry may be made in a log or other recording medium indicating that the change in service runlevel has been changed. Block 1024 shows that a re-synchronization with a common or centralized runlevel database may be initiated.

Figure 1:
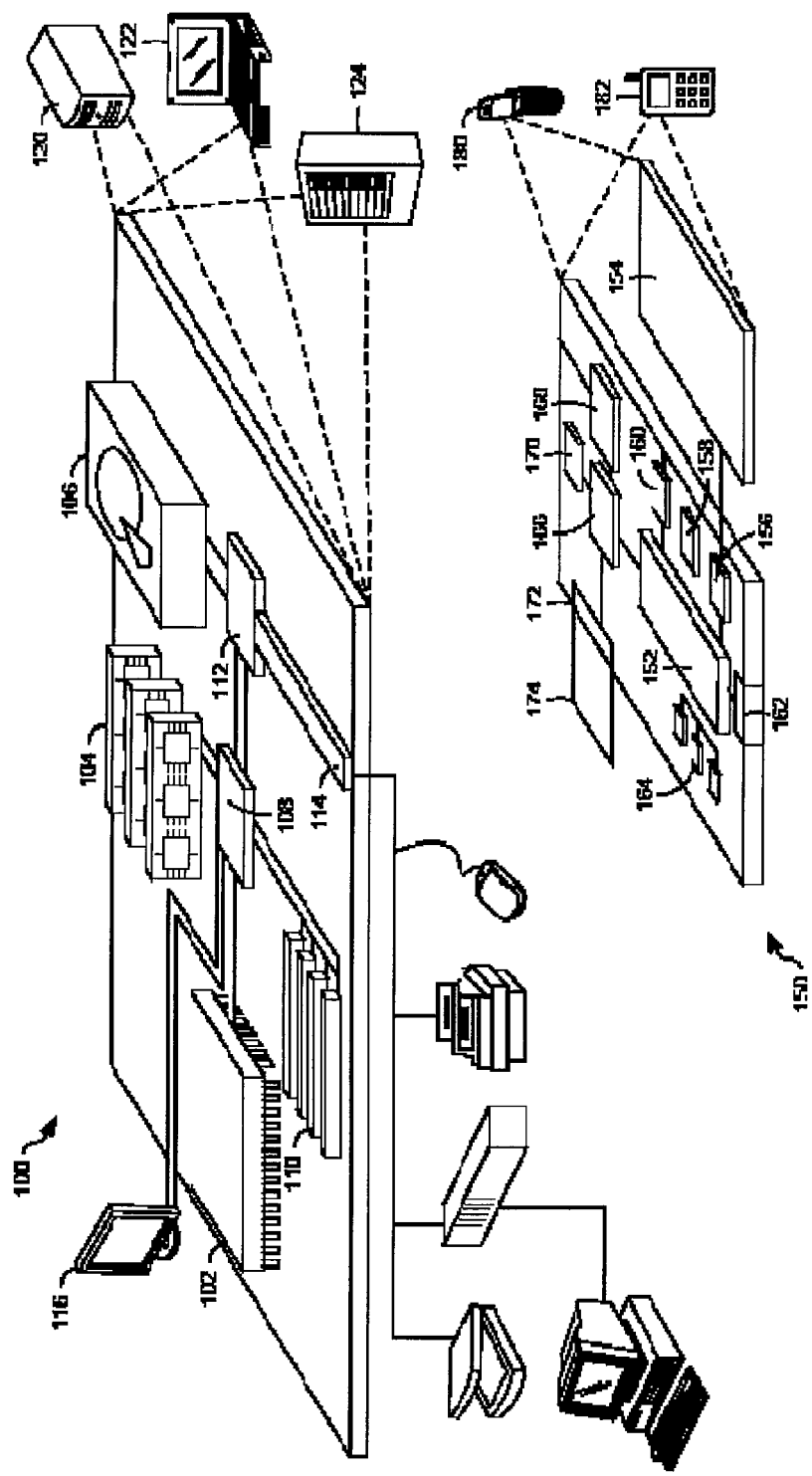
FIG. 1 is a block diagram of an example embodiment of a system in accordance with the disclosed subject matter.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, and an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152 that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for managing a plurality of tenants of a shared computing infrastructure, the shared computing infrastructure including at least one application server apparatus configured to execute, simultaneously, a plurality of instantiations of one or more services for the plurality of tenants, the method comprising:
   for each service, assigning a plurality of service runlevels, each service runlevel dictating how an action is performed or executed during a runtime or execution period of the corresponding service;
   associating each of the tenants with one or more respective tenant runlevels, each tenant runlevel dictating the actions that are allowed to be performed and/or the type of users of the tenant that are allowed to perform or request the performance of the actions on the services, each respective tenant runlevel including one or more service runlevels for corresponding one or more services;
   maintaining tenant runlevel and service runlevel associations in a runlevel mapping file;
   associating a tenant with an application being served by the application server to the plurality of tenants as at least one service, wherein the at least one service provides a set of actions that the at least one service is configured to perform;
   associating a corresponding instantiation of the at least one service with the tenant;
      determining a tenant runlevel of the tenant, and determining the one or more service runlevels included in the tenant runlevel with reference to the runlevel mapping file; and
   when the application server apparatus executes the at least one service for the tenant,
      managing the set of actions to be performed by the corresponding instantiation based at least in part upon the tenant runlevel and the one or more service runlevels determined with reference to the runlevel mapping file.

2. The method of claim 1, wherein managing includes allowing or disallowing a service to perform an action based at least in part upon the tenant runlevel associated with the tenant.

3. The method of claim 1, further including:
   executing a first instantiation of a service for the tenant with a first service runlevel based at least in part upon the tenant's tenant runlevel, and
   executing second instantiation of the service for second tenant with a second service runlevel based at least in part upon the second tenant's tenant runlevel.

4. The method of claim 1, further including:
   executing a service for the tenant at a first service runlevel based at least in part upon the tenant's first tenant runlevel, and if the tenant's tenant runlevel changes to a second tenant runlevel, executing the service for the tenant at a second service runlevel.

5. The method of claim 1, wherein the runlevel mapping file is stored in a common database, and is cached in at least part by each application server apparatus.

6. The method of claim 1, further including changing the tenant runlevel associated with a tenant at a plurality of application server apparatuses simultaneously.

7. The method of claim 1, wherein managing includes transitioning from a first tenant runlevel to a second tenant runlevel as a result of the occurrence of a predetermined event.

8. The method of claim 1, wherein
   determining a tenant runlevel includes:
      determining if an overriding runlevel is associated with the service or tenant, and if so, executing the service at the overriding runlevel; and wherein
   managing includes:
      if an overriding runlevel is associated with the service or tenant, managing the set of actions configured to be performed by the service based at least in part upon the overriding runlevel.

9. An apparatus configured to manage a plurality of tenants of a shared computing infrastructure, the shared computing infrastructure including at least one application server apparatus configured to execute, simultaneously, a plurality of instantiations of one or more services for the plurality of tenants, the apparatus comprising:
   a runlevel mapping file; and
   a processor configured to:
      for each service, assign a plurality of service runlevels, each service runlevel dictating how an action is performed or executed during a runtime or execution period of the corresponding service;
      associate each of the tenants with one or more respective tenant runlevels, each tenant runlevel dictating the actions that are allowed to be performed and/or the type of users of the tenant that are allowed to perform or request the performance of the actions on the services, each respective tenant runlevel including one or more service runlevels for corresponding one or more services;
      maintain tenant runlevel and service runlevel associations in the runlevel mapping file;
      associate a tenant with an application being served by the application server to the plurality of tenants as at least one service, wherein the at least one service provides a set of actions that the at least one service is configured to perform;
      associate a corresponding instantiation of the at least one service with the tenant;
      determine a tenant runlevel of the tenant, and determine the one or more service runlevels included in the tenant runlevel with reference to the runlevel mapping file; and
      when the application server apparatus executes the at least one service for the tenant, manage the set of actions to be performed by the corresponding instantiation based at least in part upon the tenant runlevel and the one or more service runlevels determined with reference to the runlevel mapping file.

10. The apparatus of claim 9, wherein the processor is configured to allow or disallow a service to perform an action based at least in part upon the tenant runlevel associated with the tenant.

11. The apparatus of claim 9,
wherein the processor is configured to:
   execute a first instantiation of the service for a first tenant with a first service runlevel based at least in part upon the first tenant's tenant runlevel, and
   execute second instantiation of the service for a second tenant with a service runlevel based at least in part upon the second tenant's tenant runlevel.

12. The apparatus of claim 9,
wherein processor is configured to:
   execute an instantiation of a service for the tenant at a first service runlevel based at least in part upon the tenant's first tenant runlevel, and
   if the tenant's tenant runlevel changes to a second tenant runlevel, executing the instantiation of the service for the tenant at a second service runlevel.

13. The apparatus of claim 9, wherein
the runlevel mapping file is stored in a common database; and wherein
the apparatus further includes a table buffer configured to locally cache in at least part common database.

14. The apparatus of claim 9, wherein the processor is configured to change the tenant runlevel associated with a tenant substantially simultaneously with a plurality of other apparatuses included by the shared computing infrastructure.

15. The apparatus of claim 9, wherein the processor is configured to transition the tenant from a first tenant runlevel to a second tenant runlevel as a result of the occurrence of a predetermined event.

16. The apparatus of claim 9, wherein the processor is configured to:
   determine if an overriding runlevel is associated with the service or tenant, and if so, instruct the processor to execute the service at the overriding runlevel; and
   if an overriding runlevel is associated with the service or tenant, manage the set of actions configured to be performed by the service based at least in part upon the overriding runlevel.

17. A non-transitory computer-readable medium carrying a multi-tenant application executable on an application server comprising:
   an application being served to a plurality of tenants as at least one service, wherein the application server, for each service, assigns a plurality of service runlevels, each service runlevel dictating how an action is performed or executed during a runtime or execution period of the corresponding service, associates each of a plurality of tenants with one or more respective tenant runlevels, each tenant runlevel dictating the actions that are allowed to be performed and/or the type of users of the tenant that are allowed to perform or request the performance of the actions on the services, each respective tenant runlevel including one or more service runlevels for corresponding one or more services, and maintains tenant runlevel and service runlevel associations in a runlevel mapping file;
   the application configured to have a plurality of service instantiations that are executed simultaneously for a plurality of tenants of a shared computing infrastructure; and
   an application programmable interface (API)
      a including a procedure to take as input a tenant identifier representing a tenant,
      and associate a corresponding service instantiation with the tenant, determine a tenant runlevel of the tenant and the one or more service runlevels included in the tenant runlevel with reference to the runlevel mapping file,
   wherein the set of actions to be performed by the corresponding service instantiation are based at least in part upon the tenant runlevel and the one or more service runlevels determined with reference to the runlevel mapping file.

18. The non-transitory computer-readable medium of claim 17, wherein the application programmable interface (API) comprises:
   a tenant runlevel setting procedure configured to take as input, at least:
      a tenant identifier representing a tenant, a first tenant runlevel value representing a first tenant runlevel that the tenant is to be directly set to,
      an event identifier representing an event after which the tenant is to change a second tenant runlevel, and
      a second tenant runlevel value representing the second tenant runlevel that the tenant is to change to after the event occurs.

19. The non-transitory computer-readable medium of claim 17, wherein the application programmable interface (API) comprises:
   a service runlevel setting procedure configured to:
      take as input a tenant identifier representing a tenant,
      a service runlevel identifier representing a service,
      a service runlevel value representing the service runlevel the service is to be set to; and
   a service runlevel setting determination procedure configured to:
      take as input a tenant identifier representing a tenant,
      a service runlevel identifier representing a service, and
      provide a service runlevel value representing the service runlevel the service is currently being executed at for the tenant.

20. The non-transitory computer-readable medium of claim 17, wherein the application programmable interface (API) comprises:
   a tenant excluding procedure configured to:
      take as input a tenant identifier representing a tenant that is to be excluded from being serviced by a service associated with the tenant excluding procedure;
   a tenant pardoning procedure configured to:
      take as input a tenant identifier representing a tenant that is no longer to be excluded from being serviced by a service associated with the tenant pardoning procedure; and
   a tenant exclusion determination procedure configured to:
      take as input a tenant identifier representing a tenant that may or may not be excluded from being serviced by a service associated with the tenant exclusion determination procedure, and
      produce a determination value representing whether or not the tenant is excluded from being serviced by a service associated with the tenant exclusion determination procedure.

* * * * *